3,123,436
PREPARATION OF PuF₃

Robert Benz, Los Alamos, N. Mex., assignor to the United States of America as represented by the United States Atomic Energy Commission
No Drawing. Filed Sept. 25, 1962, Ser. No. 226,780
4 Claims. (Cl. 23—14.5)

This method relates to a process for the preparation of plutonium trifluoride.

This compound, plutonium trifluoride, formed by this process is useful both in the separation of plutonium from associated fission products and in processes directed to the reduction of the said trifluoride to plutonium metal. Furthermore, plutonium trifluoride is a desirable intermediate compound in the extraction of plutonium metal from its various other compounds such as oxides, sulfides, carbides, silicides, and nitrides. I have discovered that plutonium trifluoride can be prepared by contacting plutonium oxide with ammonium fluoride in a pressure container or bomb and the analogous reaction can be expected with the other aforementioned compounds of plutonium. Such process is carried out at a temperature of 500° to 600° C. and under a minimum pressure of at least 10 atmospheres. In order to insure a reasonable rate of reaction between the selected plutonium compound and the ammonium fluoride, the aforementioned temperature range and pressure are critical limits of this process.

It is therefore an object of this invention to provide a process whereby plutonium trifluoride is prepared from an oxide, sulfide, carbide, silicide, or nitride of plutonium.

Another object of this invention is to provide a process whereby plutonium in refractory compounds is made readily soluble in dilute nitric acid.

Other objects of this invention will become apparent from the following description of a preferred embodiment of the present invention.

A mixture of 27 grams ammonium fluoride and 46 grams plutonium oxide corresponding to a mole ratio of 5:1 is reacted at a temperature of 250° C. for twelve hours in a covered nickel or graphite container. In order to insure complete fluorination, the product is cooled, ground to a powder, and reheated for two hours at a temperature of 300° C. The resulting $PuF_4$—$NH_4F$ mixture will be hereafter designated as product A. Product A is dispersed on a platinum tray in layers not exceeding ½ inch deep within a nickel bomb and heated rapidly to 550° C. and held at this temperature for one hour. During this time, the pressure resulting from the decomposition of $NH_4F$ and the reduction reaction is maintained at 18 atmospheres by venting through a valve and trap means. At the end of one hour the bomb is vented to atmospheric pressure and allowed to cool to room temperature. During the last venting step the excess $NH_4F$ is distilled from the product plutonium trifluoride. The plutonium trifluoride was analyzed and found to be 80.5 percent plutonium (theoretical 80.8 percent) with less than 100 parts per million of ammonia. Plutonium trifluoride produced by the above described method was electrolyzed in a one and one-half inch interior diameter graphite cathode crucible with a centrally located graphite anode using a temperature of 800° C. The electrolyte is comprised of lithium chloride, barium chloride and plutonium trifluoride. Upon electrolysis, pure plutonium metal was deposited at the cathode.

Other refractory compounds of plutonium which do not dissolve at an appreciable rate, if at all, in boiling $HNO_3$—$HF$—$H_2O$ are converted to a water soluble form by the fluorination with ammonium fluoride. I found that in a plutonium-aluminum-oxygen mixture which is plutonium-rich and which is fluorinated with ammonium fluoride at a temperature of 550° C. and a pressure of 18 atmospheres in a nickel bomb would form plutonium trifluoride. Thus, the use of ammonium fluoride to fluorinate refractor plutonium compounds and cause the formation of plutonium trifluoride, which is soluble in dilute nitric acid solution, will allow of methods well known in the art for the separation and reduction to plutonium metal.

An alternative process for the formation of $PuF_3$ without the use of a pressure bomb is to react $PuF_4$—$NH_4F$ in a gaseous stream of $H_2$ to 600° C. At this temperature the double salts of $PuF_4$ with $NH_4F$ decompose rapidly to plutonium trifluoride.

It will be understood that the process of this invention is capable of extensive modification and several variations in many respects, and that the preceding embodiment is an illustration only and in no way is to be construed as a limitation upon the invention set forth herein, the scope of which is defined in the appended claims.

What is claimed is:

1. A process of preparing pure plutonium trifluoride comprising contacting at least one refractory plutonium compound selected from the class consisting of oxides, sulfides, carbides, silicides, and nitrides of plutonium with ammonium fluoride in a closed container at a pressure of at least 10 atmospheres and a temperature of from about 500° to 600° C.

2. A process of preparing pure plutonium trifluoride comprising contacting plutonium oxide with ammonium fluoride in a closed container, heating the mixture to 250° C. to form $PuF_4$—$NH_4F$, heating the reactants to a temperature of 550° C., and holding at this temperature for one hour and at the same time maintaining a pressure of 18 atmospheres within the said container.

3. A process of preparing plutonium trifluoride comprising contacting plutonium-aluminum-oxygen compound with ammonium fluoride in a closed container, heating the reactants to a temperature of 550° C. while at the same time maintaining a pressure of 18 atmospheres within the said container.

4. The process of claim 2 in which the $PuF_4$—$NH_4F$ is ground to a powder and heated for two hours at a temperature of 300° C. prior to the step of being heated to a temperature of 550° C.

References Cited in the file of this patent
UNITED STATES PATENTS
2,917,360    Tolley et al. _____ Dec. 15, 1959